(12) United States Patent
Yanagihara et al.

(10) Patent No.: US 6,567,919 B1
(45) Date of Patent: May 20, 2003

(54) AUTHENTICATED COMMUNICATION PROCEDURE FOR NETWORK COMPUTERS

(75) Inventors: Kazu Yanagihara, Santa Cruz, CA (US); Gregory Burns, Los Altos, CA (US); Gregory Vaughan, Santa Cruz, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/168,062

(22) Filed: Oct. 8, 1998

(51) Int. Cl.$^7$ ............. G06F 11/30; G06F 15/16; G06F 9/24; H04L 9/00; H04L 9/32
(52) U.S. Cl. ............. 713/201; 713/2; 713/155; 713/164; 713/165; 713/202; 709/227; 709/229; 709/237
(58) Field of Search ............. 713/2, 155, 164, 713/165, 184, 200, 1, 100, 201, 202; 709/227, 229, 237, 228

(56) References Cited

U.S. PATENT DOCUMENTS 5,812,764 A * 9/1998 Heinz et al.
6,052,779 A * 4/2000 Jackson et al.

OTHER PUBLICATIONS

Ted, Typical System Access Control Problems and Solutions, Jan. 1988, p. 1.*
Schwartz, Resolving The Access Conundrum, Apr. 1996, p. 1–3.*
Machlis, Software Tokens Shield Data, Oct. 1997, p. 1–3.*
O'Reilly, Computer Security Basics, Jul. 1991, p. 64.*

* cited by examiner

Primary Examiner—Norman M. Wright
Assistant Examiner—Jenise Jackson
(74) Attorney, Agent, or Firm—Burns, Doane, Swecker & Mathis, L.L.P.

(57) ABSTRACT

Authentication of a request by a computer for access to a resource is accomplished by means of a randomly generated password that can only be used a limited number of times. In a disclosed embodiment of the invention, a network computer sends a boot request to a network server. In response, the network server generates a random password, and sets a use counter to a value which indicates the number of times that the password can be used for access to network resources. This password is transmitted to the network computer, which uses it to initiate a session with a network file server, and access network resources. The network server then invalidates the password, by decrementing the use counter to zero. As a result, even if the password becomes known to an unauthorized user as it is being transmitted from the network server to the network computer, it cannot be improperly employed to gain access to any network resources.

17 Claims, 3 Drawing Sheets

| | 46<br>HW Addr | 48<br>Name | 50<br>Volume | 52<br>PW | 54<br>Count |
|---|---|---|---|---|---|
| 38 → | 12.34.56.78 | NC#1 | Disk#1 | WXYZ | 1 |
| | 23.45.67.89 | NC#2 | Disk#3 | ABCD | 0 |
| | 99.88.77.66 | NC#3 | Disk#7 | QR3Z | 1 |
| | 10.20.30.40 | NC#4 | Disk#5 | JKLM | 0 |
| | 15.37.84.94 | NC#5 | Disk#2 | 5O2F | 0 |
| | 68.83.72.60 | NC#6 | Disk#9 | PR6S | 0 |

AUTHENTICATED COMMUNICATION PROCEDURE FOR NETWORK COMPUTERS

FIELD OF THE INVENTION

The present invention is generally directed to communications between computers in a network computing environment, or the like, and more particularly to the protection and administration of passwords that are used to authenticate one computer to another during communications between them.

BACKGROUND OF THE INVENTION

As the use of personal computers in the workplace increases, it is becoming commonplace to interconnect those computers by means of a local area network, or the like. In one form of local area network, each user node might comprise a fully-featured personal computer or workstation. For instance, an individual user's computer might include one or more permanent storage devices, e.g., hard disk drives, a dedicated printer, and a modem for communications external to the network.

As the sophistication and use of local area networks continues to evolve, more and more functions are being provided by centralized network servers, rather than the individual workstations themselves. For example, to facilitate backup and retrieval, it has become a common practice to store all data files on a network file server, rather than on local media at the individual workstations. Other types of services are also being handled at the network server, for example external connections to remote sites. Consequently, there has been a move toward so-called network computing, which reduces the need for fully-featured computers at each user location. Typically, the network computer at each user node in such a system might consist solely of a microprocessor, random access memory, input devices such as a keyboard and mouse, and a display monitor. All other devices associated with the computing environment, e.g., file storage, modems, printers, etc. are associated with, and controlled by, the network server. Since the individual terminals located at the user nodes contain a minimal amount of hardware, the cost of this type of arrangement is significantly less than a local area network which employs personal computers, or similar types of fully-featured computers, at the user nodes.

The network computer typically does not provide local file storage capabilities. As a result, it is necessary to download required software, such as the computer's operating system, application programs, and the like, from the network server after a connection has been established. For security purposes, requests for access to file storage at the network server must be authenticated by means of a password. If the network computer itself does not have non-volatile memory to store the password between different sessions, the password is provided to the network computer by the server as part of the boot process. This transmission of the password via the network raises a different security issue, however, since it is potentially capable of being obtained by an unauthorized user when it is transmitted from the server to the network computer. In such a case, the unauthorized user may also be able to gain access to files on the network server, or other network resources.

Accordingly, it is an objective of the present invention to provide a communications process which permits a computer to be authenticated to another computer, such as a network server, by means of a password, without compromising the integrity of the password in a manner that would permit unauthorized access to computer system resources.

SUMMARY OF THE INVENTION

In accordance with the present invention, authentication of a request by a computer for access to system resources is accomplished by means of a randomly generated password that can only be used a limited number of times. In an exemplary embodiment of the invention, when a network computer is turned on, it sends a boot request to a network server. In response, the network server generates a random password, and stores the password in a file to indicate that it is associated with the network computer that issued the boot request. In addition, a use counter is set to a value which indicates the number of times that the password can be used for access to network resources, preferably once. This password is transmitted to the network computer, which then uses it to initiate a session with a network file server, and mount a storage volume. Once the storage volume has been mounted, the network computer has access to the files on that volume, and the password is no longer needed. Consequently, the network server invalidates the password, by setting the use counter to zero. As a result, even if the password becomes known to an unauthorized user as it is being transmitted from the network server to the network computer, it cannot be subsequently employed to gain access to any network resources.

Further features of the invention, and the advantages provided thereby, are explained in greater detail hereinafter with reference to an embodiment of the invention illustrated in the accompanying drawings.

DETAILED DESCRIPTION

To facilitate an understanding of the present invention, it is described hereinafter with reference to a particular embodiment in which a password is employed during the initial boot process of a network computer, to authenticate access to network resources, such as files in a network file server. It will be appreciated, however, that the principles which underlie the invention are not limited to this particular example. Rather, the invention is applicable to a variety of situations in which communications between two computers over a network, or other communication path, are authenticated with the use of a password that is provided from one to the other.

Figures 1, 4:
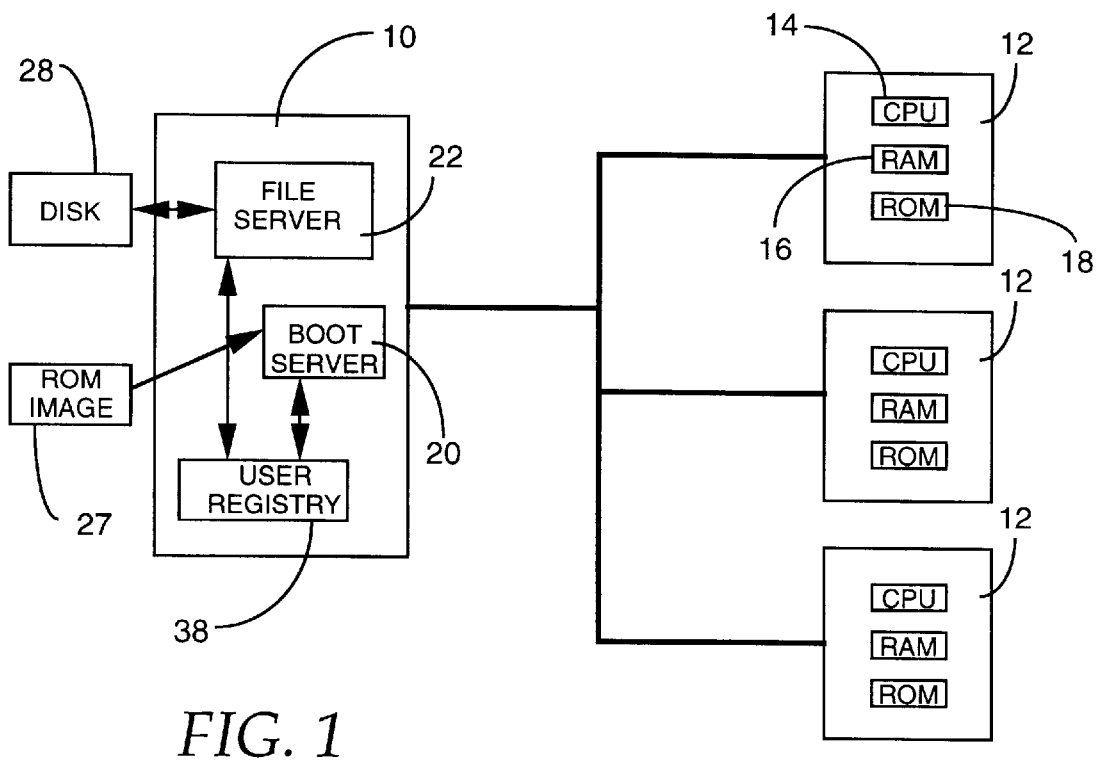
FIG. 1 is a general block diagram of a network computing system of a type in which the present invention might be employed.
FIG. 4 is a diagram of the contents of a user registry.

FIG. 1 is a block diagram of an exemplary network computing system in which the present invention might be employed. A network server 10 is connected to one or more clients 12, e.g. network computers, by means of communication paths which operate in accordance with a conventional network communication protocol, e.g., Ethernet. Each network computer includes a central processing unit 14, e.g., a microprocessor, working memory 16 in the form of random access memory (RAM), and a minimal amount of firmware, embodied in a read-only memory (ROM) 18. The firmware stored in the ROM 18 comprises the initial set of instructions that are required for the client 12 to initiate a boot process with the network server 10, to establish a connection between them. Typically, most of the other software that is necessary to operate the client is stored at the server, and transferred to the client during the boot process, as described in detail hereinafter.

Although not illustrated in FIG. 1, each network client 12 also includes suitable user input devices, such as a keyboard and mouse, and an output device in the form of a display monitor, to permit the user to interface with the network and programs being executed on the client.

The network server 10 manages all of the resources that are utilized in the network computing environment. Two fundamental components of the network server include a boot process server 20, and a file server 22. Other resources might also be present at the server, e.g. modems for access to external sites, and the like. The boot server 20 communicates with a network client 12 when the client is first activated, e.g., powered on, and functions to set up a communications session between the client and the network server 10. The file server 22 manages the flow of data between the network clients and storage media at the file server, such as hard disk drives and the like.

Before the user can operate a network computer, it is necessary that the network client at the user's location be operatively connected to the network server 10, and that the operating system for controlling the CPU 14 at the client be loaded into its working memory 16. To this end, therefore, the network server 10 sets up two communications sessions with the network computer 12. The first session is hidden from the user, and permits the network server to communicate with a driver in the network computer to provide access to a system file image and perform virtual memory paging. The second session is initiated by the user, or user software. This session provides access to data files and application programs. One of the objectives of the present invention is to permit the network computer drive to access the network server in a hidden session, while limiting the ability of users to establish file server sessions.

Figure 2:
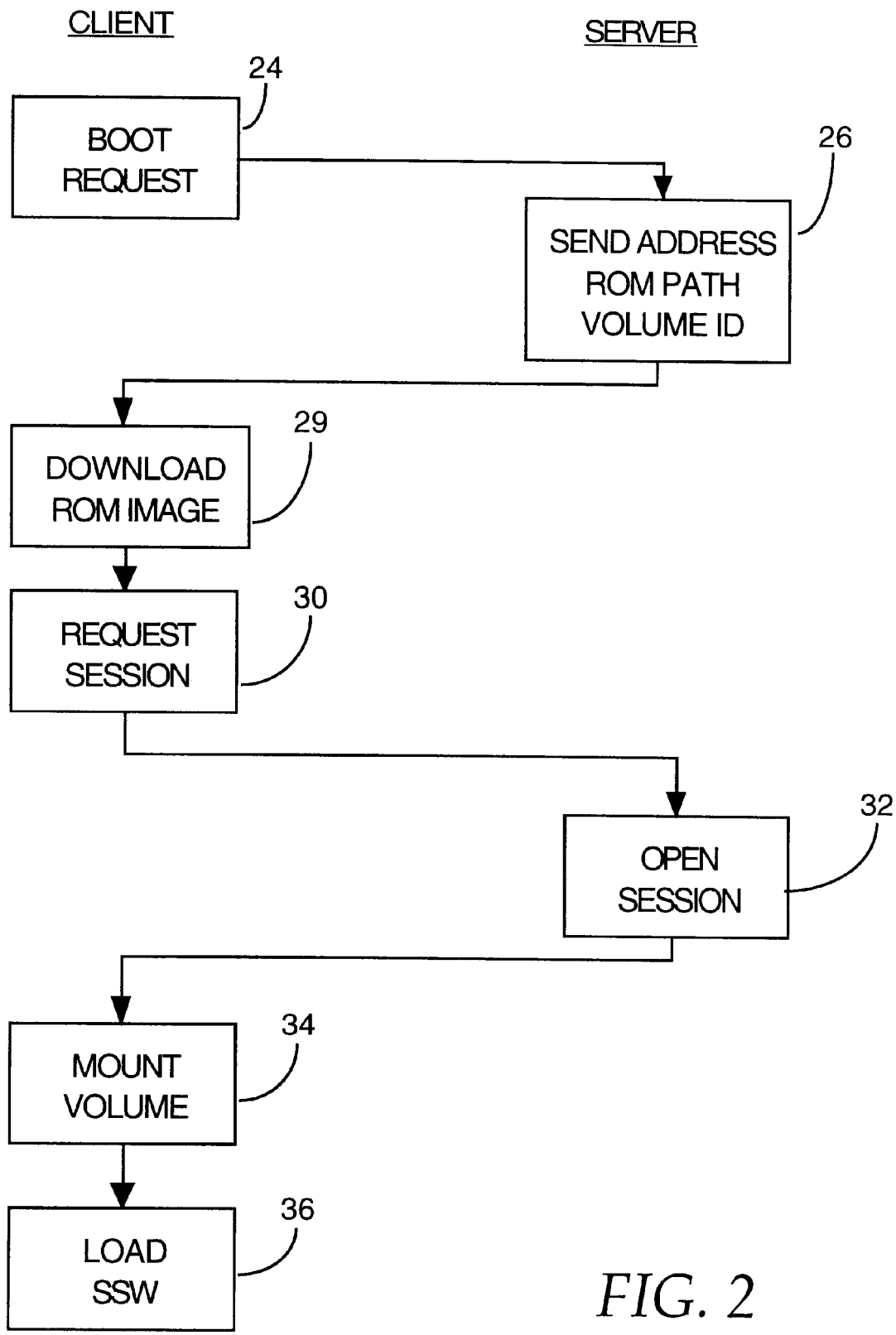
FIG. 2 is a flow chart of the basic operations that are carried out during the boot process.

The details of the boot process for placing the client in an operational state, when it is first connected to the network server, are depicted in the flow chart of FIG. 2. This flow chart represents one or more software programs that are stored on suitable computer-readable media associated with the boot server 20 and the file server 22. In the flow chart, actions which occur within the network client 12 are depicted on the left side, and those which are carried out by the network server appear on the right side. When the network client 12 is first turned on, or otherwise activated, the firmware stored in its internal ROM 18 sends a boot request to the boot server 20, at step 24. This boot request includes an identification of the particular client machine which transmitted the request. In a network which is based upon the Ethernet protocol, for example, the identification can be the hardware Ethernet address for a network communications card in the client 12. Any other type of information which is capable of uniquely identifying the client can also be employed.

In response to receipt of the boot request, the boot server 20 replies at step 26 with information that is needed for the client to establish a connection. This information might include, for example, a TCP/IP address that is assigned to the client, a path to a ROM image file 27 stored at the server, and the identification of a storage volume 28 containing the data that will be used by the client. The ROM image contains those portions of the operating system which allow it to continue with the boot process. In response to receipt of the information from the boot server, the network client 12 downloads the ROM image file at step 29. This image file might be provided directly via the boot server, as shown in the figure, or via a different server which is dedicated to this process. Up to this point, all communications between the network client 12 and the network server 10 are transparent to the user.

After downloading the ROM image file, the client computer 12 begins to execute the code contained in it, to establish a user session with the file server 22. For this purpose, the operating system software in the ROM image file includes a device driver which enables the client to communicate with the storage volume identified by the boot server. Using the device driver, at step 30 the server sends a request to the file server 22 to open a file session. In response, the file server provides the client 12 with access to the identified storage volume at step 32, by sending it the relevant volume identification information that is required to mount the volume at the client. Using this information, the client then mounts the volume that was specified in the reply from the boot server, at step 34. This volume contains the remainder of the system software that is needed for the client 12 to operate. As it is needed, the client accesses this system software from the mounted volume at step 36, to thereby place it in an operational state for the user.

Before the file server 22 can establish the user session with a client 12, it is necessary to confirm that the network computer which is attempting to mount a storage volume is, in fact, a recognized computer. More particularly, in the first step of the boot process, a client 12 is able to identify itself to the network server 10 by means of its Ethernet address, or the like. However, the subsequent user session is carried out by means of established protocols, e.g. TCP/IP. As a result, the hardware address can no longer be used to authenticate the client to the server. Accordingly, a password is used for this authentication, to provide a link between the original identification which was used during the boot request and subsequent file server requests.

Since the network computer itself does not include non-volatile memory which is capable of storing a password between different sessions, the appropriate password is provided to the network computer by the boot server 20, as part of the initial boot process. For example, when the boot server provides the network computer with the appropriate TCP/IP address and identification of the ROM image file and assigned storage volume, at step 26, it can also supply the network computer with the password that is required for initial access to the file server. The network computer can thereafter use the password at step 30, when requesting a file session to be opened. If the proper password is received by the file server, it responds with the appropriate information to permit the network computer to mount the storage volume.

A concern that arises in this situation is the security of the password. Since the password must be transmitted from the network server 10 to the network computer 12, the possibility exists that the password could be observed by another computer which is monitoring traffic on the network. If the password is learned by an unauthorized user under these circumstances, it is possible that the unauthorized user could gain access to the file server by means of the password. In accordance with the present invention, this security issue is addressed by using randomly generated passwords, and by limiting the number of times that each password can be used to access the file server.

Figure 3:
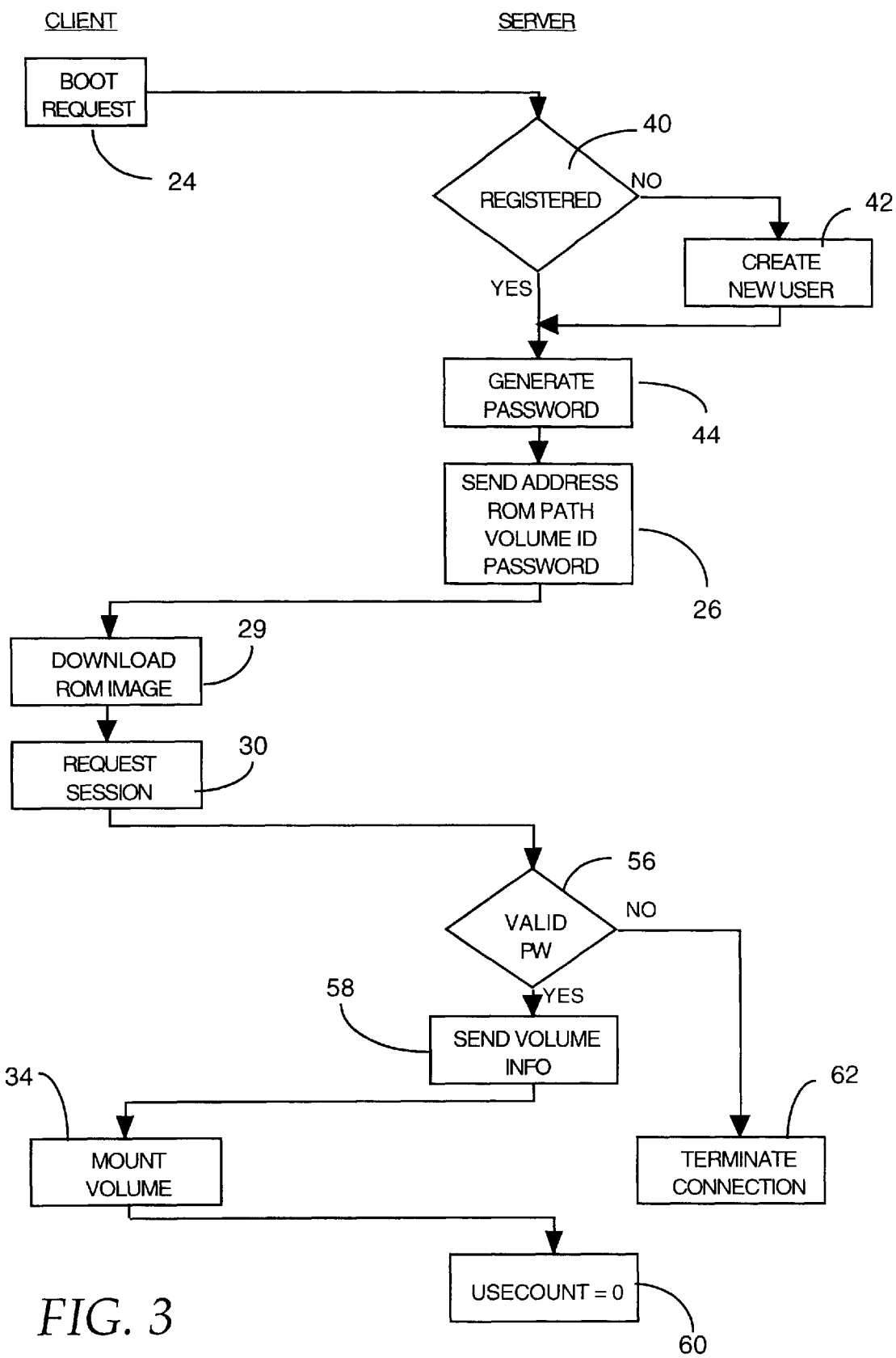
FIG. 3 is a more detailed flow chart of the boot process in accordance with the present invention.

A more detailed illustration of the boot process, depicting the generation and administration of passwords in accordance with the present invention, is illustrated in the flowchart of FIG. 3. When the boot server 20 receives a boot request from a network computer, it first checks a user registry 38 in the file server, at step 40, to determine whether a user having a hardware address which matches that of the requesting network computer has already been registered. If not, the boot server creates a new user and enters the user into the registry, at step 42. Basically, the creation of a new user involves the assignment of a name, or user ID, for that user, and storing that name in the registry in association with the network computer's hardware address. In addition, a user folder is created on one of the disk drives 27 of the network server. This folder contains an image file for the operating system software, as well as a virtual memory backing store file that is used by the network computer after it has been properly booted and mounted the storage volume.

After confirmation that the requesting network computer has been previously registered, or after newly registering the network computer, the user's password is set to a randomly generated value, at step 44. In addition, a use count value is stored in connection with the password. The use count is set to a minimal number, to limit the number of times the newly generated password can be used to access network resources. FIG. 4 illustrates an example of various entries that might appear in the user registry 38. For each user, the registry contains a listing of its hardware address 46, user identification 48, assigned storage volume 50, password 52 and use count 54. In a preferred embodiment of the invention, when the password is generated, its use count is set to a value of one. In the particular example illustrated in FIG. 4, the first and third network computers in the registry, NC1 and NC3, are currently undergoing the boot process, and therefore their use count values are equal to one. All the other registered network computers have a use count value of zero, for reasons explained in detail hereinafter.

After the random password has been generated at step 44, the boot server 20 replies to the boot request, as described previously in connection with step 26. Included in the information that is supplied to the requesting network computer is the randomly generated password that has been assigned to the network computer for the current boot process.

Upon receipt of this information, the network computer downloads the ROM image at step 29 and then, using the device driver provided with the ROM image, requests a file session with the file server 22. In its request, the network computer supplies its user name and the password which was provided in reply to the boot request. Upon receipt of this data, the file server 22 checks the user registry 38, to determine whether the password is validly associated with the name of the computer requesting the file session, at step 56. If the password is valid, the file server provides the network computer with the appropriate volume identification information, to permit the network computer to mount the volume that was specified in the reply to the boot request, at step 58. In response, the network computer mounts the volume, at step 34, and completes the boot process.

Once the network computer has successfully mounted the volume, the file server invalidates the password that was assigned to the network computer, by setting its use count value to zero at step 60. As a result of this action, even if another computer connected to the network had been able to obtain the password when it was transmitted from the boot server to the network computer that issued the boot request, that other computer would not be able to employ the password to gain access to the requesting computer's copy of the system software and other files in its storage volume. Rather, only the network computer which has properly mounted that volume, using an assigned password, can gain access to those files.

If, at step 56, a request for a file session was not accompanied by the appropriate password, no user session is established with the computer making the request. Hence, the validity of a password is dependent not only on that particular password being stored in the user registry. In addition, the password must have a positive use count value, i.e. one or greater. If the use count value is equal to zero, it indicates that the network computer associated with the password has already mounted its assigned volume, and therefore no other computer is permitted to gain access to its files.

As an alternative to storing a use count and subsequently decrementing it upon mounting of the storage volume, it is possible to set a flag bit upon generating the password, and resetting the flag bit after access to the storage volume has been granted. As another alternative, the password can be deleted from the user registry after access is granted, in which case a use count or flag bit is not needed.

In summary, a randomly generated password is assigned by the boot server for each new boot process, to thereby prevent a previous password from being used to improperly gain access to network files in subsequent sessions. Furthermore, by limiting the number of times that an assigned password can be used to mount a storage volume, the same password is prohibited from being used by multiple network computers during the same session. Consequently, the security of the network, particularly access to system files, remains intact, even though passwords are transmitted over the network during the boot session.

It will be appreciated by those of ordinary skill in the art that the present invention can be embodied in other specific forms without departing from the spirit or essential characteristics thereof. For instance, while an exemplary embodiment of the invention has been described in the context of the booting of a network computer, the practical applications of the invention are not limited to this particular example. Rather, the principles of the invention are applicable to any situation in which communications between two or more computers are accompanied by a password whose integrity must be maintained. Furthermore, while the use of a password has been described in connection with the mounting of a storage volume, it will be appreciated that the password might be employed in connection with attempts to access any other type of resource which is external to the requesting computer.

The presently disclosed embodiment is therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A method for establishing a connection between two computers, comprising the steps of:

generating a random password at a first computer, and storing the password as a valid password to be used for communication with a second computer;

transmitting said random password from the first computer to the second computer;

transmitting a request for access for an operative connection from said second computer to said first computer, said request including said random password;

determining, at the first computer, whether the password included with said request is a valid password associated with the second computer;

establishing said operative connection if the password is determined to be a valid password associated with the second computer; and removing the valid association between the password and the second computer, to thereby inhibit any further connections which are associated with said password.

2. The method of claim 1, wherein said operative connection comprises access to a resource controlled by said first computer.

3. The method of claim 1, wherein said password is stored at the first computer in association with an identification of the second computer, and a count value is stored with the password to indicate that it is a valid password for use in communications with the second computer.

4. The method of claim 3, wherein the count value that is initially stored with the password is a positive value, and the valid association between the password and the second computer is removed by reducing the stored count value to zero.

5. The method of claim 4, wherein the initial count value is equal to one, and is reduced to zero when said operative connection is established.

6. A method for establishing a connection between a network server and a network client, comprising the steps of:

transmitting a boot request from the client to the server, which request includes an identification of the client;

generating a random password at the server, in response to said request, and storing the password as a valid password to be used for communication with the identified client;

transmitting said random password from the server to the identified client;

transmitting a request for access to a server resource from said client to the server, said request for access including said random password;

determining, at the server, whether the password included with said request for access is a valid password associated with the client which transmitted the request;

providing the requesting client with access to the server resource if the password is determined to be a valid password associated with the requesting client; and removing the valid association between the password and the requesting client, to thereby inhibit any further access to server resources which are associated with said password.

7. The method of claim 6, wherein said server resource is a storage volume, and the requesting client obtains access to the storage volume by mounting the volume at the client.

8. The method of claim 6, wherein said password is stored at the server in association with an identification of the client, and a count value is stored with the password to indicate that it is a valid password for use in communications with the client.

9. The method of claim 8, wherein the count value that is initially stored with the password is a positive value, and the valid association between the password and the client is removed by reducing the stored count value to zero.

10. The method of claim 9, wherein the initial count value is equal to one, and is reduced to zero when the client is first provided access to the server resource.

11. A network server for a network computing system, comprising:

a boot server responsive to a boot request from a network computer for generating a random password, storing an indication that said password is a valid password, and transmitting the password to the requesting computer; and a file server that is responsible to a request for access to files from a network computer, which is accompanied by a password, for determining whether the received password is stored as a valid password associated with the requesting computer, granting access to the files if the password is determined to be valid, and deleting the stored indication that the password is valid in response to said granting of access.

12. The network server of claim 11, wherein said boot server indicates that a randomly generated password is valid by storing a first predetermined use count value in association with the password, and said file server invalidates a password by changing the use count to a second predetermined value.

13. The network server of claim 12, wherein said first predetermined value is a positive numerical value, and said file server changes the use count to a non-positive value.

14. The network server of claim 11, wherein said file server invalidates a password by deleting it from the location at which it was stored by the boot server.

15. A computer-readable medium containing a program which executes the following procedure:

responding to a request for communication from a requesting computer by generating a random password, storing said password with an indication that it is a valid password and transmitting said password to the requesting computer; and responding to a request for access to a resource from a computer, which request is accompanied by a password, by determining whether the password which accompanied the request is stored as a valid password, granting the requested access if the password is determined to be stored as a valid password, and deleting the indication that the password is a valid password.

16. The computer-readable medium of claim 15, wherein the password is indicated to be a valid password by storing a first predetermined value in association with the password, and the valid indication is deleted by changing said stored value.

17. The computer-readable medium of claim 15, wherein said valid indication is deleted by removing the password from the location at which it was stored.

* * * * *